(12) United States Patent
Wood et al.

(10) Patent No.: US 11,249,979 B2
(45) Date of Patent: Feb. 15, 2022

(54) SYSTEMS AND METHODS FOR LIVE, ON-DEVICE CONFIGURATION VALIDATION

(71) Applicant: Hewlett Packard Enterprise Development LP, Houston, TX (US)

(72) Inventors: Frank Wood, Roseville, CA (US); Scott A. Gulland, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 416 days.

(21) Appl. No.: 16/207,052

(22) Filed: Nov. 30, 2018

(65) Prior Publication Data

US 2020/0174993 A1 Jun. 4, 2020

(51) Int. Cl.

| | | |
|---|---|---|
| *G06F 16/23* | (2019.01) | |
| *H04L 12/24* | (2006.01) | |
| *G06F 16/21* | (2019.01) | |
| *G06F 16/22* | (2019.01) | |

(52) U.S. Cl.
CPC ........ *G06F 16/2365* (2019.01); *G06F 16/217* (2019.01); *G06F 16/2282* (2019.01); *H04L 41/08* (2013.01); *H04L 41/22* (2013.01)

(58) Field of Classification Search
None
See application file for complete search history.

(56) References Cited

U.S. PATENT DOCUMENTS

| | | |
|---|---|---|
| 8,832,241 B2 | 9/2014 | Mithyantha |
| 9,699,029 B2 | 7/2017 | Guntaka et al. |
| 2004/0260818 A1* | 12/2004 | Valois ................ H04L 63/101 709/229 |
| 2010/0211548 A1 | 8/2010 | Ott et al. |
| 2013/0073513 A1 | 3/2013 | Kemper et al. |

(Continued)

FOREIGN PATENT DOCUMENTS

WO    WO-0190843    11/2001

OTHER PUBLICATIONS

Himura, Y. et al., Static Validation of Network Device Configurations in Virtualized Multi-tenant Datacenters, (Research Paper), International Symposium on Integrated Network Management, 2013, 9 Pgs.

*Primary Examiner* — Giuseppi Giuliani
(74) *Attorney, Agent, or Firm* — Sheppard Mullin Richter & Hampton LLP

(57) ABSTRACT

Embodiments of the present disclosure provide systems and methods for performing network device configuration validation online. A second instance of the command process (a shadow interpreter) can be run within a isolated validation environment on a network device that is active on a network. A copy of the configuration database on the network device is associated with the isolated validation environment. The validation handler erases the currently running configuration commands within the validation copy of the configuration database, and enters each new configuration command through the shadow interpreter to validate the new configuration commands on the network device without impacting the current functioning of the network device. After all the new configuration commands are entered, the validation report generates a report identifying the validation status for each command.

20 Claims, 7 Drawing Sheets

(56) References Cited

U.S. PATENT DOCUMENTS

| | | |
|---|---|---|
| 2014/0040182 A1 | 2/2014 | Gilder et al. |
| 2014/0122855 A1 | 5/2014 | Maneval |
| 2015/0193464 A1 | 7/2015 | Kwon et al. |
| 2018/0285211 A1 | 10/2018 | Eberhard et al. |
| 2019/0138435 A1* | 5/2019 | Iida ........................ G06F 12/02 |

* cited by examiner

SYSTEMS AND METHODS FOR LIVE, ON-DEVICE CONFIGURATION VALIDATION

DESCRIPTION OF RELATED ART

Computer networks, such as wide-area networks (WANs), storage area networks (SANs), and enterprise networks, among others, may comprise a collection of networking devices configured to communicate information. Such such networking devices may include routers, switches, hubs, modems, and other devices.

Each networking device is configured to operate within the network. Configurations for networking devices can be complex. To ensure proper functionality, configurations for networking devices are generally validated. Configuration validation is a tedious process, requiring each command to be verified, generally line by line.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
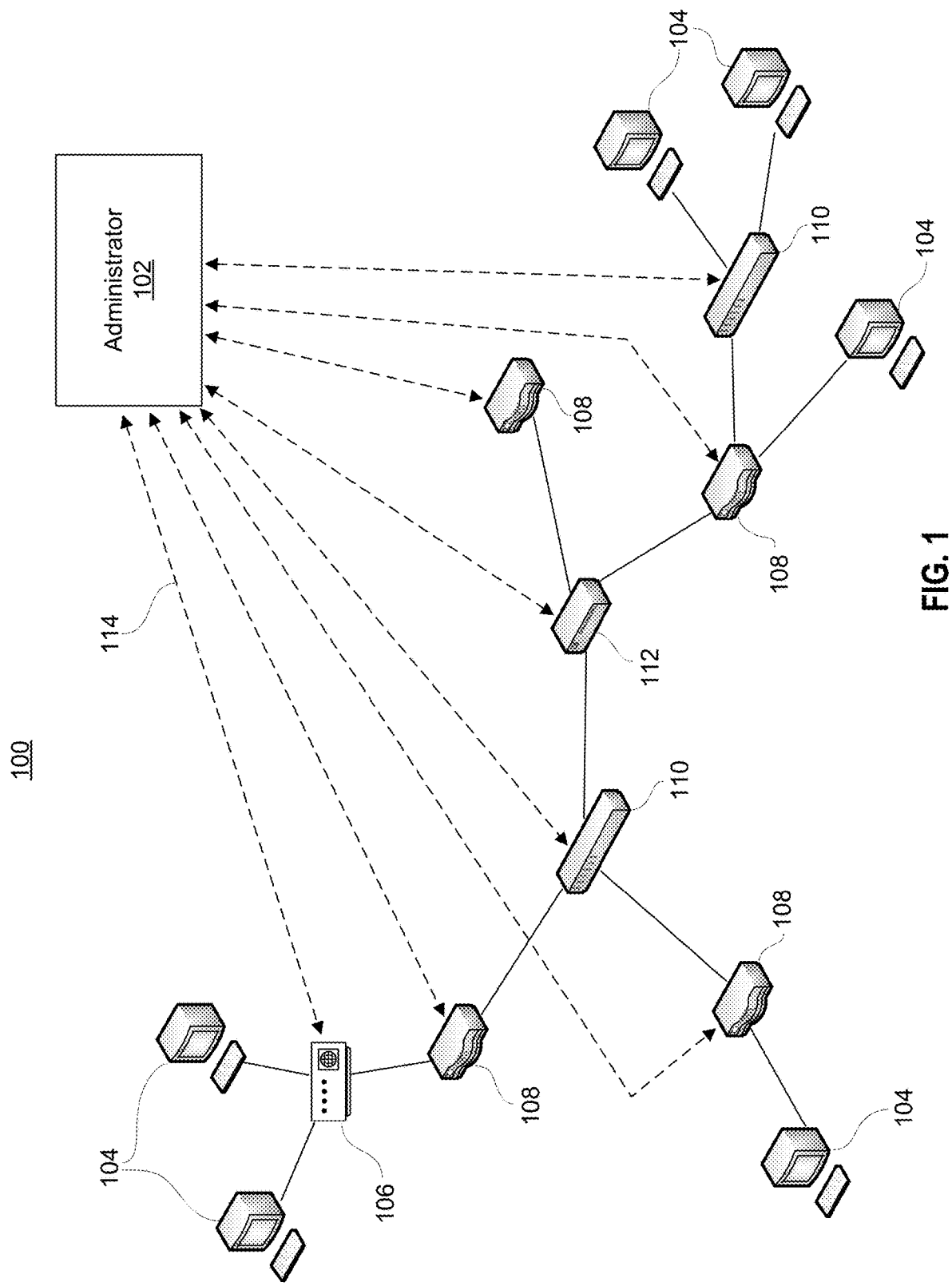
FIG. 1 illustrates an example network in accordance with embodiments of the technology disclosed herein in accordance with embodiments of the technology disclosed herein.

The figures are not exhaustive and do not limit the present disclosure to the precise form disclosed.

DETAILED DESCRIPTION

Network devices may be configured in one of two ways. One method is to enter configuration commands locally through a command line interface of the network device. The other method is to send configuration commands to the network device through a simple network management protocol (SMNP). Under both methods, the configuration commands directly impact the operation of the network device, including the various data structures and feature sets of the device. Once the command is entered and/or received by the network device, the configuration aspect of the network device associated with the configuration command is immediately changed. Accordingly, if an error exists within the configuration command such that the new configuration is not compatible with the network device's capabilities, a misconfiguration results. Misconfigurations can cause costly disruptions of service within the computer network. Therefore, network administrators want to validate configuration profiles (the set of commands of the configuration) prior to porting the configuration profile to the network device to avoid misconfigurations as much as possible.

Current approaches to validating configuration profiles are costly and prone to potential errors and misconfigurations. Performing validation on a network device when it is online and operating in the computer network is generally avoided because any error causes an immediate misconfiguration in the computer network, resulting in the same costly disruption validation is supposed to avoid. Accordingly, the current approaches require validation to be performed offline. One method of offline validation involves developing and building a test network environment that replicates the computer network in which the network device will operate. The test environment can be run to validate configuration profiles prior to porting the configuration to a target network device. Traditionally, a test environment requires a duplicate test network, similar to the running computer network, and corresponding software to operate the test network. Duplicate test hardware is also necessary to set up the test network as well as to stand in for the target network device. This is a costly endeavor, requiring what amounts to duplicating a complex computer network, which includes the design and building of such an environment. Moreover, separate operating software and/or physical components of the test environment are device-type specific. A separate set of components may be needed if the network device is a chassis device or a power over Ethernet (POE) capable device, or if the network device is a bridge or a router.

Another traditional method of validating configuration profiles offline involves developing a simulated version of the target network device. A virtual version of the target network device is written, and designed to emulate (as closely as possible) the device characteristics. These device characteristics can include the hardware details or characteristics of the target network device. Validation programs may be run on the simulated network device and, if validated, the configuration profile can be stored on the target network device. However, similar to the test environment approach, using a simulator is rather complex, generally requiring an entire virtual network to be developed to test a configuration profile. Different versions of the virtual environment will need to be developed for each type of network device. This added complexity also increases the cost of validation. Moreover, the simulation software would need to be updated for any firmware update(s) made to the network devices.

Both methods of validation suffer from another deficit—generally, neither method validates the configuration profile on the actual hardware for which it is written. With the simulation approach, the validation is done with a virtual representation of the hardware of the network device. Differences in how certain commands may be performed may be present in the software-defined version, given differences in the virtual environment. These changes may indicate a valid command during testing, which may be incompatible with the network device once implemented. By not validating the configuration profile using the actual hardware, the potential for misconfigurations increases, and indeed, misconfigurations are quite common.

In the test environment, a duplicate network device, similar to the target network device, may be used. Although some steps may be taken to minimize hardware differences between the target network device and the duplicate network device, nevertheless, the duplicate network device does not embody/does not include the same hardware for which the configuration profile is intended. In some cases, a valid command on one network device may not be compatible with another network device that is similar, but still not the same with respect to type and hardware details. One way to overcome this hardware discrepancy is to use the target network device in the test environment, but such an approach would require a substitute network device to be configured and implemented in the operational (non-test) network. This approach would also require the substitute network device to remain operational while a new configuration profile is validated on the target network device, itself adding cost and complexity.

Embodiments of the present technology enable online validation of configuration profiles on the network device, avoiding many of the issues associated with current approaches. As discussed here, embodiments of the present technology create an isolated validation environment on the network device in which configuration profiles may be validated while the network device remains operational in the computer network. This "shadow" process can be run concurrently with the network device's normal operation, using the actual hardware and software of the device itself to perform validation.

A database structure can be used to store configuration and device details on the network device. When a new configuration profile needs to be validated, a command to activate the isolated validation environment can be used to start the validation process, and a copy of the database structure may be requested. Any new configuration commands can then be validated in view of actual/target network device details (e.g., memory allocations, port assignments, processing power, etc.) to ensure that the new configuration is compatible with the network device. As the isolated validation environment does not directly impact the current operation of the network device, any errors may be flagged and identified, allowing for revisions to be made without causing a misconfiguration. Once validated, a new database structure including the new configuration profile is stored for later use. At any future point, the validation results (new configuration profile) can be deployed to the network device replacing the running configuration profile with the new configuration profile.

FIG. 1 illustrates an example computer network 100 in accordance with embodiments of the present technology disclosed herein. As illustrated, computer network 100 includes a variety of network devices providing communication between end terminals 104. A client may have a variety of end terminals 104, such as servers, which need to communicate in a variety of different ways based on client requirements. In various embodiments, the computer network 100 may be a local area network (LAN), a wide area network (WAN), a storage area network (SAN), an enterprise network, or other type of network configuration. Computer network 100 is simplified for ease of discussion, but a person of ordinary skill in the art would understand that the technology disclosed herein is applicable to any network configuration.

The end terminals 104 of computer network 100 may be connected through a variety of different network devices. Network devices provide connectivity between different end terminals 104 within network 100, based, e.g., on client requirements or operating preferences. Non-limiting examples of network devices include modems 106, routers 108, switches 110, and bridges 112. In various embodiments, additional network devices may be present within computer network 100.

Currently, the way in which configuration commands are entered and maintained within network devices is implementation-specific and generally proprietary to the manufacturer of a network device. Generally, a command-line interface (CLI) is used to enter configuration commands. The CLI communicates directly with the processes and processors running on the device, and immediately effectuates the new configuration command with the associated process or processor. As each configuration command is entered individually, the configuration command is formatted by the CLI and embedded in the firmware of the relevant hardware components of the networking device (e.g., application-specific integrated circuit (ASIC)). Accordingly, the configuration commands directly impact functioning of the network device, risking costly misconfigurations if entered while the network device is online and operating in the network.

Moreover, the CLI is not a repository for storing configuration commands that have been entered by way of the CLI. The configuration commands are difficult to identify following configuration due to the proprietary nature in which different device and/or component manufacturers design the embedding process. The hardware and software were highly coupled to ensure fast, efficient, and small code to operate. Therefore, it is very difficult and a highly intensive process to try and aggregate all of the configuration commands entered into a network device.

Figure 2:
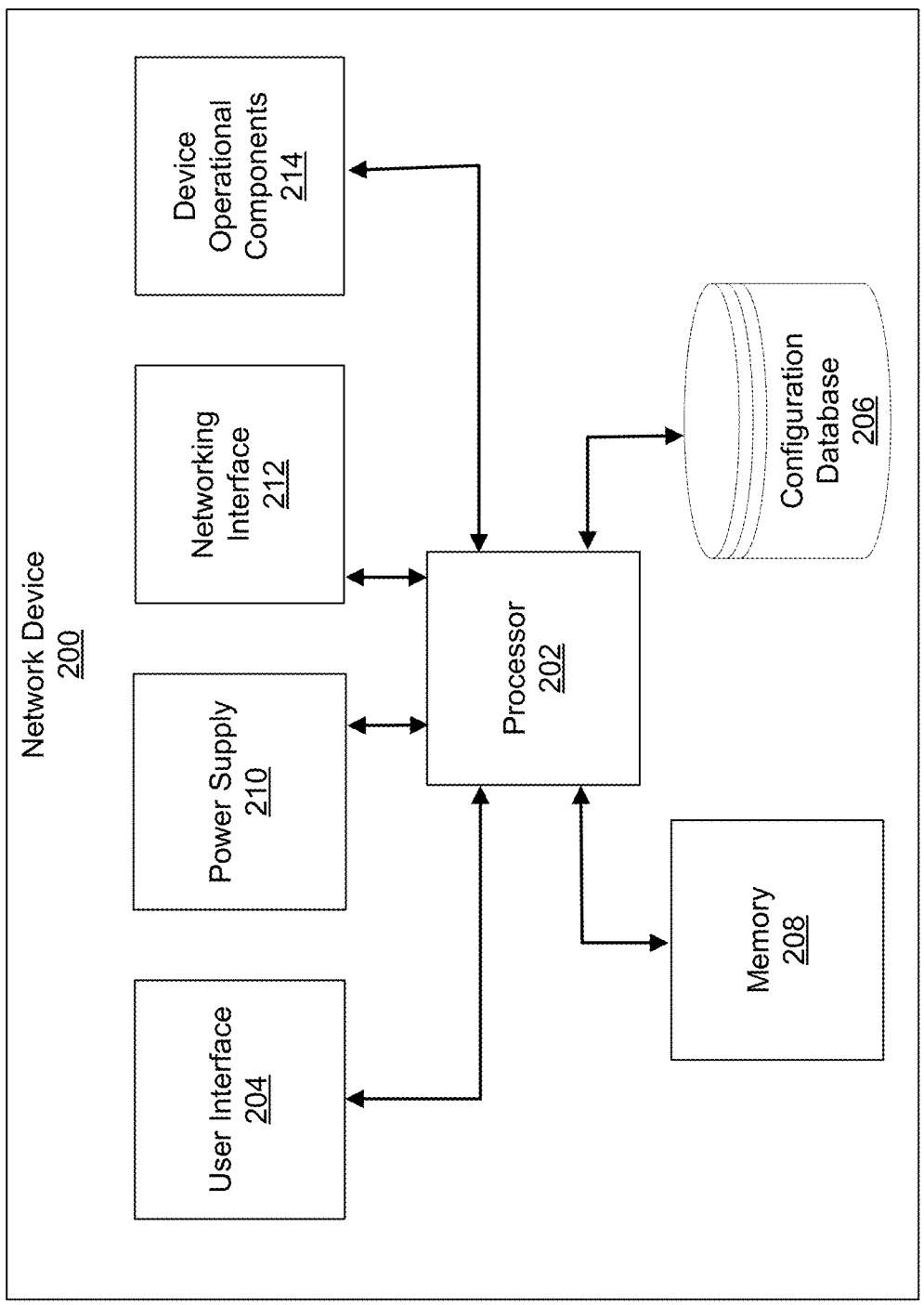
FIG. 2 illustrates an example network device in accordance with embodiments of the technology disclosed herein.

FIG. 2 illustrates an example network device 200 in accordance with embodiments of the technology disclosed herein. Network device 200 represents the common components of various network devices, such as modems 106, routers 108, switches 110, and bridges 112 illustrated in FIG. 1. Additional components (i.e., device-specific components 214) are included in different embodiments of network device 200, depending on the nature of the device (e.g., the device is a router). That FIG. 2 focuses only on common components should not be interpreted as limiting network devices 200 in accordance with the technology disclosed herein to only those components. A person of ordinary skill in the art would understand how to implement device-specific components 214 within the network device 200 to enable the network device 200 to perform its intended functions within the network, such as fabric cards, management modules, and Gbics.

As illustrated in FIG. 2, the example network device 200 includes a processor 202 for executing and controlling the functions of the network device 200. In various embodiments, more than one processor 202 may be implemented in network device 200. In various embodiments, the processor 202 may have a single processing core, while in other embodiments the processor 202 may have multiple processing cores. In some embodiments, one or more of processors 202 may be configured to perform specific tasks. Non-limiting examples of processor 202 includes: a microcontroller; a microprocessor; an application-specific integrated circuit (ASIC); a field programmable gate array (FPGA); among other types of components configured to perform arithmetic and logic operations according to a set of instructions.

The network device 200 may also include a user interface 204 communicatively coupled to the processor 202. The user interface 204 enables a person to enter commands and perform other actions directly at the network device 200. In various embodiments, the user interface 204 may be a physical user interface included on the network device 200. Non-limiting examples of physical user interface 204 include: a touch screen interface; a keyboard; a display; a touchpad; among other physical interfaces known in the art. In various embodiments, the user interface 204 may be an output port or ports configured to allow one or more entry devices to be connected to the network device 204 to enable local entry of commands. For example, in some embodiments the user interface 204 may be a video graphics array (VGA) connector to enable a separate display to be connected to the network device, allowing a user to view a graphics output of the network device 200 (e.g., a CLI interface). Non-limiting examples of the output ports for user interface 204 include one or more variants of the following connection protocols: PS/2; USB; DVI; HDMI; registered jack (RJ); BNC; TNC; Firewire; DisplayPort; Thunderbolt; among other connection types. In various embodiments, the user interface 204 may be a network or management port.

In various embodiments, the user interface 204 interacts with a user interface program executed by the processor 202 to enable a user to interact with the network device 200. In various embodiments, the user interface program executed may be a CLI, where the processor 202 displays a CLI interface to a user through the user interface 204. A user may enter one or more commands into the CLI through user interface 204, which the processor 202 can receive and process. In various embodiments, unlike current solutions, the processor 202 may store received configuration commands in a configuration database 206 rather than merely interpret and embed the command within firmware of specific components.

Configuration database 206 maintains a plurality of data associated with the operation of the network device 200. In various embodiments, configuration database 206 can include a plurality of data tables, each data table concerning different aspects of the network device 200. For example, in some embodiments one or more data tables may be platform-specific, describing the hardware capabilities of the network device 200 (e.g., memory capacity, processing power, network port numbers, etc.), one or more tables may be protocol-specific (e.g., Network Time Protocol (NTP), Ethernet, etc.), and one or more tables may be function-specific (e.g., virtual local area network (VLAN), etc.). Configuration database 206 also includes a relationship file, describing the relationship between each of the data tables included. In some embodiments, each data table may have its own relationship file, maintaining the relationships between the respective data table and the other data tables in the configuration database 206. Each data table includes operational data and configuration commands. In various embodiments, the operational data defines the relevant function or hardware component, and the configuration commands comprise how the function or hardware is to operate within the network.

In various embodiments, every data field in the one or more data tables are assigned a classification, identifying the type of data. For a non-limiting example, classifications can include "configuration", "status", and "statistics". The configuration classification identifies data entries that are the provided by configuration commands of the network device. The status classification identifies data entries associated with the operating state of the corresponding platform-, protocol-, or function-specific data table. The statistics configuration is a collection of statistics describing operation of the system associated with that data entry. Through such classification, embodiments of the technology disclosed herein maintain a clear listing of the configuration commands of the network device without the need for separate actions (e.g., polling the various network device components).

The configuration database 206 facilitates instantiation of the device configuration during the startup process of network device 200. Current solutions embed the configuration data within the firmware of the various components separately, allowing configuration to occur but limiting the ability to identify all configuration data at once. Non-limiting examples of configuration database 206 include: random access memory (RAM); static RAM (SDRAM); dynamic RAM (DRAM); read only memory (ROM); programmable ROM (PROM); erasable PROM (EPROM); electrically EPROM (EEPROM); flash memory; solid state memory; among others.

Network device 200 may further include memory 208 communicatively coupled to processor 202. Memory 208 may store one or more sets of computer instructions relevant to the operation of the network device 200. Processor 202 may execute the sets of computer instructions to perform various functions. In various embodiments, memory 208 may comprise volatile memory, non-volatile memory, or a combination thereof. Non-limiting examples of memory 208 include: random access memory (RAM); static RAM (SDRAM); dynamic RAM (DRAM); read only memory (ROM); programmable ROM (PROM); erasable PROM (EPROM); electrically EPROM (EEPROM); flash memory; solid state memory; among others. In various embodiments, memory 208 and configuration database 206 may be combined into a single component, with configuration database 206 being a partitioned section of the memory component.

Network device 200 further includes a power supply 210 communicatively coupled to the processor 202. Power supply 210 provides the necessary power level for the network device 200 to operate, based on its design. In various embodiments, the power supply 202 may be connected through one or more cables to all of the components of the network device 200. In other embodiments, the power supply 202 may be connected to a power backplane configured to distribute the necessary power to the one or more components of the network device 200, the components being connected through connectors on the power backplane. In such embodiments, processor 202 may be communicatively coupled to the power backplane. In various embodiments, more than one power supply 202 may be included. The processor 202 may be configured in various embodiments to monitor the power supply 210, and in other embodiments the processor 202 may also be configured to control the operation and configuration of the power supply 202.

Network device 200 further includes a networking interface 212 communicatively coupled to the processor. Networking interface 212 may include one or more different network communication interfaces, depending on the types of communication protocols applicable to a given network device 200. For example, in some embodiments network device 200 may include interfaces for communicating over Ethernet, both wired (i.e., an Ethernet port) and wirelessly (i.e., an Ethernet transceiver). Non-limiting examples of the types of interfaces that may be included in networking interface 212 include: Ethernet interfaces; Bluetooth transceivers; Wi-Fi; cellular communication (e.g., 4G, 5G, LTE, etc.); among others. Network device 200 may receive one or more configuration commands through one or more portions of network interface 212, rather than directly through the user interface 208, in various embodiments. In such embodiments, administrator 102 of FIG. 1 may send configuration commands over the network connection, which may be received and processed by the CLI.

Network device 200 can also include additional device operational components 214 communicatively coupled to the processor 202. As discussed above, device operational components 214 includes additional components necessary for the network device 200 to operate as one of the networking devices discussed with respect to FIG. 1. For example, where network device 200 is operating as a router 108, device operational components 214 may include a forwarding engine board (FEB) configuration to provide route lookup and forwarding functions for the router 108. A person of ordinary skill in the art would understand what components to include within device operational components 214 to enable the network device 200 to operate in accordance with its class type. In various embodiments, processor 202 may directly control the one or more components within device operational components 214, while in other embodiments the processor 202 may communicate with a dedicated processor associated with one or more components of the device operational components 214.

As discussed above, embodiments of the technology disclosed herein enable live, online configuration validation to be performed at the network device in the network. In this way, more accurate validation is possible (by using the actual device to be configured), the time to validate is reduced (by reducing the need to either remove the device from the network or to integrate the pseudo-validated configuration profile from a test device to the target device), and reduce the overall cost of validation (by reducing the need to develop test benches, either through a physical test network or a simulator emulating the target device). This previously unattainable function involves executing the validation program within an isolated validation environment on the device.

Figure 3A:
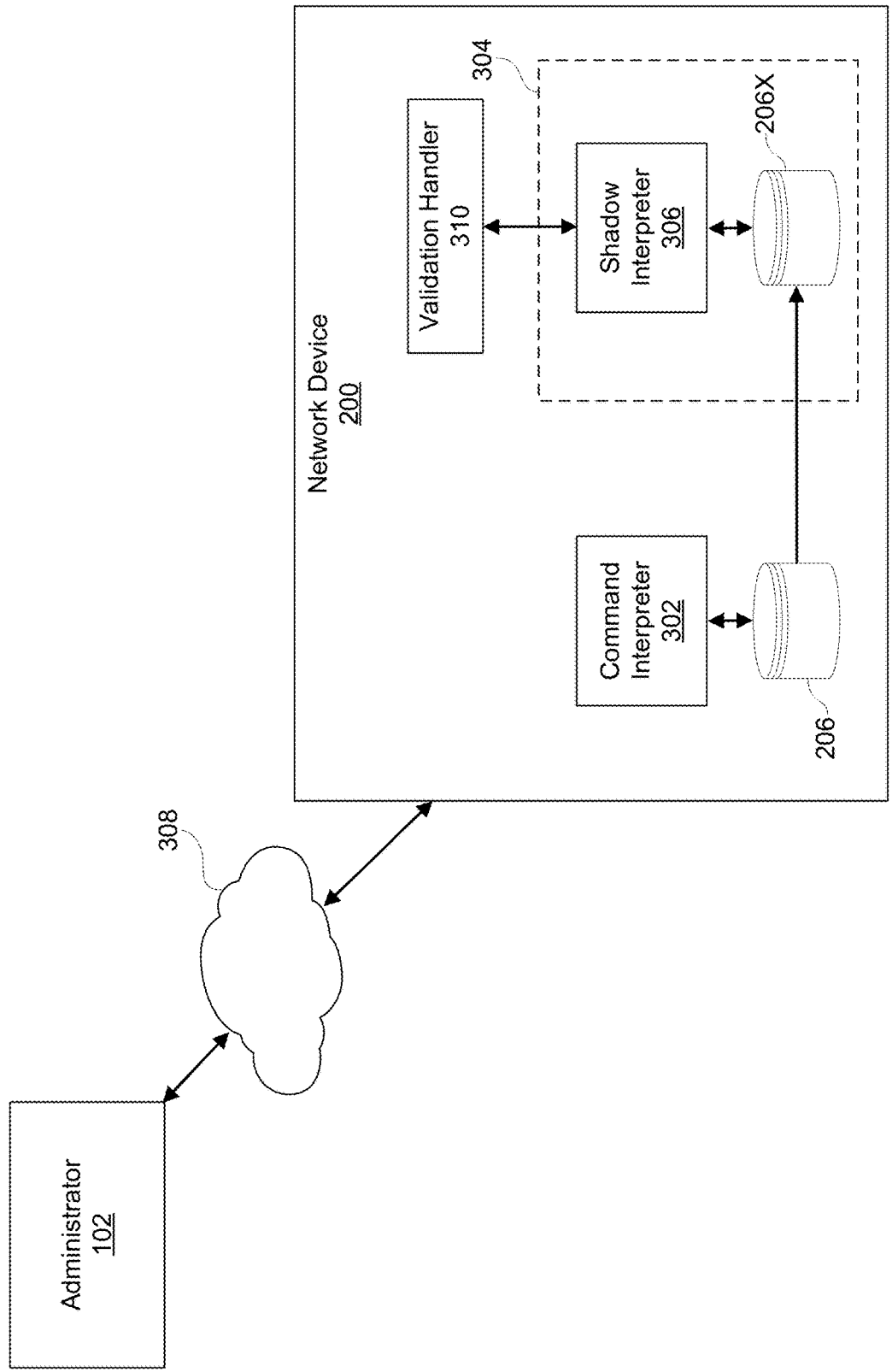
FIG. 3A illustrates an example architecture for online validation of device configuration profiles on network device in accordance with embodiments of the technology disclose herein.

FIG. 3A illustrates an example architecture for online validation of device configuration profiles on network device 200 in accordance with embodiments of the technology disclosed herein. Where reference numerals are common between figures, the description for the referenced character applies in each figure. As illustrated in FIG. 3A, an administrator 102 is communicatively coupled to the network device 200 through a network 308. In various embodiments, the network 308 may be a local area network (LAN), a wide area network (WAN), a software-defined WAN or LAN (SDWAN or SDLAN), or any other type of communication network. The network device 200 may be communicatively coupled to the network 308 through one or more of the networking interfaces (not pictured), such as networking interfaces 212 discussed with respect to FIG. 2. In some embodiments, the administrator 102 may be an individual at a network site, such as a data center or other core site, who manages the network 308. In various embodiments, the administrator 102 may interact with the network 308 through a graphical user interface or portal, depending on the implementation.

During operation, the configuration commands stored in the configuration database 206 are interpreted by a command processor 302. In various embodiments, command interpreter 302 is a function executed by the processor 202 discussed with respect to FIG. 2. The command interpreter 302 may be part of the operating system of the network device 200. The command interpreter 302 interprets each configuration command, which is written in a particular format, and executes the commands. Execution of the command may include validating the command syntax, checking for semantic errors (i.e. using a VLAN that has not been defined), and converting the command into one or more specific data elements in a format understandable by one or more components of the network device 200. In various embodiments, the command interpreter 302 may be part of the CLI. The command interpreter 302 can store the configuration commands received in the configuration database 206 when received through the user interface 208 or the networking interface 212.

When a new configuration profile needs to be validated, the administrator 102 can send a validation start command to the network device 200 over network 308. In various embodiments, the validation start command may be a command to instantiate an isolated validation environment 304. Isolated validation environment 304 is a sandbox-type execution environment, wherein commands executed within the isolated validation environment 304 does not actually control any of the network device components. As the current configuration profile or other operational data of network device 200 are maintained in a database format, use of the isolated validation environment 304 is possible and effective because all the necessary data is readily available.

A validation handler 310 receives the validation start command from the administrator 102. The validation handler 310 manages the validation process. In various embodiments, upon receipt of the validation start command, the validation handler 310 creates the isolated validation environment 304, generates the validation copy 206X of the current configuration profile (discussed in detail below), send a command to erase all the "configuration" classified data entries from the validation copy 206X, generate the validation report, and (ultimately) destroy the isolated validation environment 304.

A shadow interpreter 306 within the isolated validation environment 304 performs the functions of the command interpreter 302. In various embodiments, shadow interpreter 306 is a second process instance of the process from the command interpreter 302. This enables the use of the actual command interpretation code of the network device 200, rather than requiring either separate command interpretation code to be developed for a simulator or using a similar (but separate) device to perform validation. Using the actual command interpretation code results in more accurate and effective validation of configuration commands. And also reduces the time necessary for validation as the validation is performed on the device, in parallel with the actual operation of the network device 200 in the network, rather than performing validation independent of the actual network device 200 (thereby requiring integration once the validation processes are completed).

As illustrated in FIG. 3A, a validation copy 206X of the configuration database 206 is generated and associated with the isolated validation environment 304 by the validation handler 310. In various embodiments, the validation handler 310 can send CLI commands one-by-one to the shadow interpreter 306 (in the isolated validation environment 304) to generate the validation copy 206X. In various embodiments, the validation copy 206X contains all the data and information maintained by configuration database 206, as discussed with respect to FIG. 2. For validation purposes, the administrator 102 may send a new configuration profile, which the validation handler 310 can store in validation copy 206X rather than the configuration database 206. In various embodiments, the new configuration profile is included in the validation start command from the administrator 102 that initiated the need for the isolated validation environment 304. In other embodiments, the new configuration profile may be sent to network device 200 in a subsequent command received by validation handler 310. The new configuration profile replaces in the validation copy 206X the configuration profile (i.e., the current configuration data) currently within the configuration database 206. The new configuration profile may comprise a plurality of commands in a listed fashion, such as {command #1;command #2; command #3; . . . ; command #N}. Each command is individually identifiable.

The configuration profile comprises all the commands describing how a plurality of hardware components and software processes operating on the network device are to operate. In various embodiments, validation handler 310 may create the validation copy 206X within a separate memory component than configuration database 206, while in other embodiments the validation copy 206X may be generated in a partition of the same memory component as configuration database 206.

To validate the new configuration profile, the validation handler 310 enters each configuration command into the shadow interpreter 306. The shadow interpreter 306 reads and executes the commands provided by the validation handler 310, which then stores the configuration data within the validation copy 206X (with a "configuration" classification). This process is nearly identical to the process executed by command interpreter 302, except that the commands interpreted by shadow interpreter 306 is not actually executed by network device 200.

While validation is occurring, the shadow interpreter may generate errors due to command syntax or semantic error or due to incompatibility between a new configuration command and the network device. When this occurs, the shadow interpreter 306 can generate an error message, identifying the specific command which caused the error. During validation (and usually during execution), a master copy of the data in the validation copy 206X is created, which combines all of the data from the various data tables included. In this way, the shadow interpreter 306 may identify that an error occurred at a specific CLI command within a configuration profile. The validation handler 310 detects the error and saves the line number and error message for inclusion in the validation results report. For example, the shadow interpreter 306 may identify that an error occurred attempting to execute a specific line within a master copy file. Based on this identification, the administrator 102 is capable of identifying which command caused the error. In various embodiments, the error message would include a description of the type of error which occurred.

Based on the error message, the administrator 102 may revise one or more configuration commands (including or not including the command where the error occurred) and attempt to revalidate the new configuration profile based on a validation report. In various embodiments, the validation handler 310 may be programmed to generate and send a validation report to the administrator over network 308. The administrator 102 may use the validation report to develop revisions to the configuration profile. In various embodiments, the administrator 102 may apply prediction software, such as machine learning and neural networks, to make the determination of what revisions to make. The administrator 102 can then send the revised configuration profile to the network device 200, and the validation process may be run again with the validation handler 310 erasing the previous "configuration" classified data entries and inputting the revised configuration profile.

Once the validation handler does not find any errors in the new configuration profile (including any revised commands), the administrator 102 may load the new configuration profile into the configuration database 206. In various embodiments, the administrator 102 may receive the validation report indicating no errors and send a stop command to cleanup the validation process. In various embodiments, the validation copy 206X is deleted and the process fork for the shadow interpreter 306 is stopped, and the isolated validation environment is stopped. The administrator may then send the new configuration profile over the network 308 to network device 200 to update the configuration database 206. In some embodiments, the administrator 102 may send a command to replace the configuration database 206 with the validation copy 206X. A copy of the new configuration profile can also be maintained by the administrator 102 at one or more repositories within the network, enabling the administrator to use the configuration profile in similar devices (or to reimage the current network device 200).

Figure 3B:
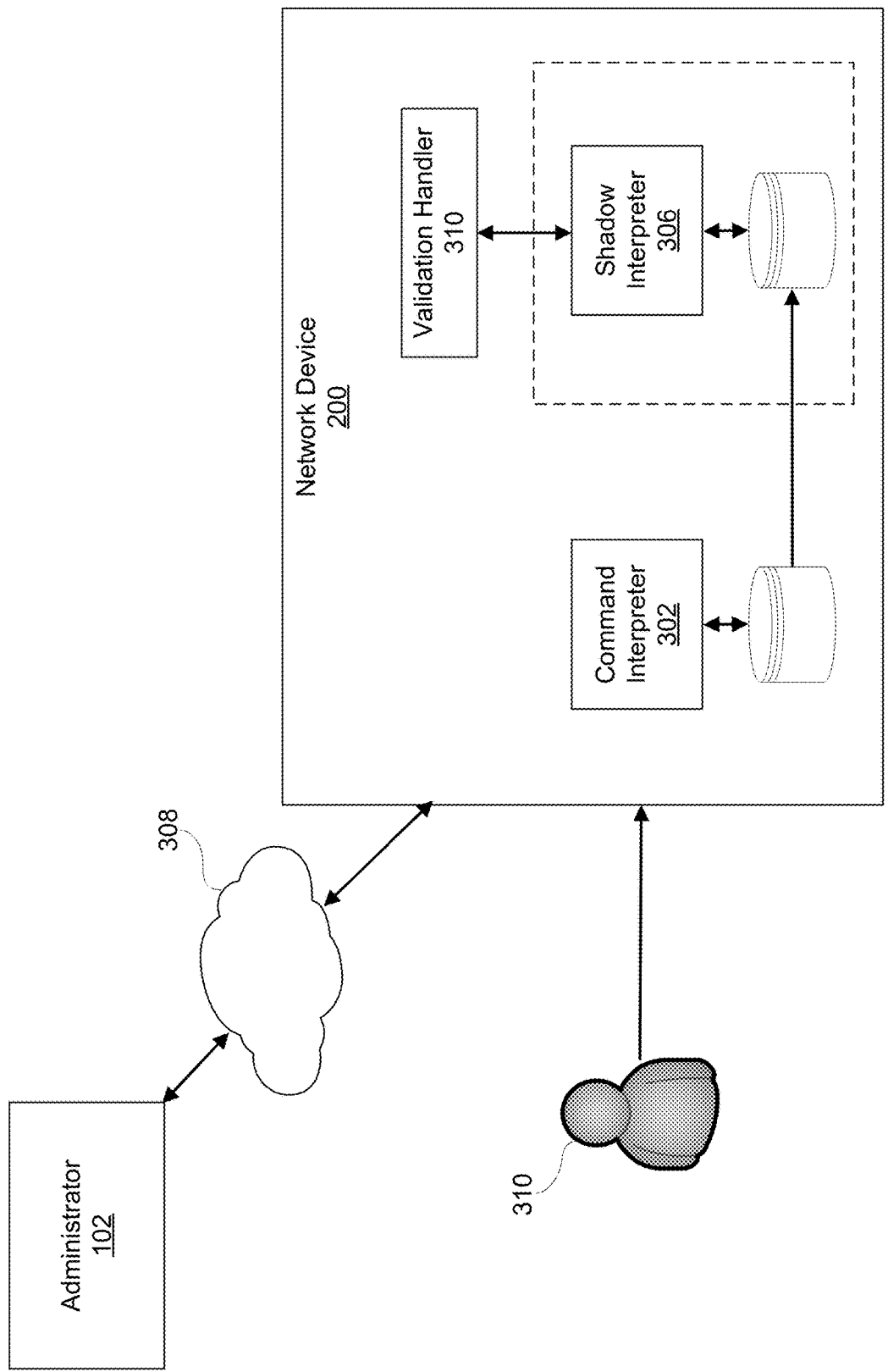
FIG. 3B illustrates another example architecture for online validation of device configuration profiles on network device in accordance with embodiments of the technology disclose herein

In some embodiments, the validation program may be triggered directly at the network device 200. FIG. 3B illustrates where a user 310 may enter the command to start validation through a user interface of the network device 200. In various embodiments, the user 310 may direct the network device 200 to poll the administrator 102 for the new configuration commands, while in other embodiments the user 310 may enter the configuration commands directly into the CLI. In some embodiments, the user 310 may perform all of the same functionality of the administrator 102 discussed with respect to FIG. 3A. In other embodiments, the user 310 and the administrator 102 may share aspects of the validation process.

By generating a copy of the database (which includes the configuration commands), embodiments of the present disclosure enable validation to be performed on the network device while in operation. The lack of ability of current devices to perform such online validation results in higher costs, longer validation times, and still many misconfigurations occur. Generating the sandbox-style execution environment (isolated validation environment 304), the technology disclosed herein can validate the various configuration commands using the actual software of the network device without impacting the direct operation of the network device.

Figure 4:
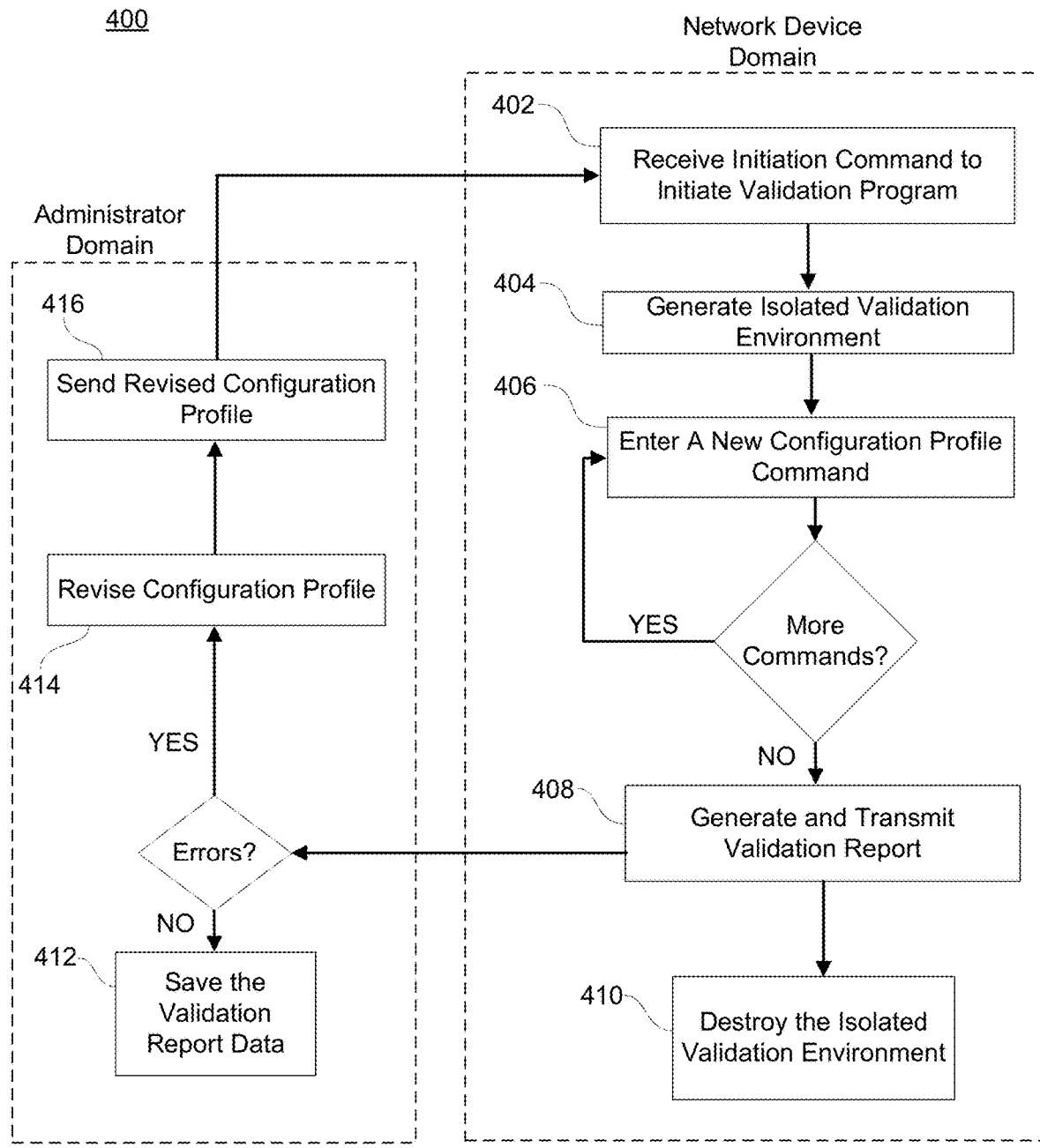
FIG. 4 illustrates an example method of performing live, on-device validation in accordance with various embodiments of the technology disclosed herein.

FIG. 4 illustrates an example method 400 of performing live, on-device validation in accordance with embodiments of the present disclosure. The method 400 may be implemented within the network described with respect to FIGS. 1, 2, 3A, and 3B. The method 400 illustrates the operations performed within the network device domain and the administrator domain. At 402, an initiation command is received by a network device to initiate a validation program. In various embodiments, the initiation command may be sent over a network by an administrator, and received through a networking interface. In other embodiments the initiation command may be entered locally through a user interface of the network device. In various embodiments, the initiation command can include a new configuration profile, comprising the new configuration commands. In embodiments where the initiation command is entered locally, the configuration commands may be entered line-by-line.

At operation 404, an isolated validation environment is generated. The isolated validation environment is a sandbox-type execution environment where commands may be executed without impacting the operation of the network device. This is similar to entering a safe mode on a computer, wherein the programs are capable of running but no changes are being made to the underlying hardware and/or firmware. In various embodiments, the isolated validation environment may be created by a validation handler on the network device. The validation handler may be implemented in hardware, software, or a combination of both, managing the validation program. In various embodiments, the validation handler may be configured with or, with access to, instructions defining the isolated validation environment. In various embodiments, the isolated validation environment may be defined within the validation program and generated by execution of one or more instructions stored on the network device. In other embodiments, the instructions may be sent to the validation handler of the network device following the command to initiate the validation program, while in other embodiments the validation handler may request the instructions. In some embodiments, the permissions of the isolated validation environment may be adjustable by the validation handler, to accommodate different types of validation to be performed. In various embodiments, a second command interpreter, or shadow interpreter, for the isolated validation environment is generated. The shadow interpreter is the same code as the main command interpreter, but is run within the isolated validation environment such that commands interpreted by the shadow interpreter do not directly impact the operation of the network device.

Also at operation 404, a validation copy of the configuration database is generated. As discussed above, the configuration database maintains the current configuration and various other operational data of the network device. The validation copy of the configuration database is a duplicate that is made by the validation handler and associated with the shadow interpreter such that the shadow interpreter and the validation copy are communicatively coupled. In some embodiments, the validation copy may comprise a master table including all of the data entries in the plurality of data tables comprising the configuration database. As discussed above, the validation copy and the configuration database may be maintained within the same memory component, separated by use of a partition or other data segregation means known in the art. In other embodiments, the validation copy may be maintained on a separate memory component. In various embodiments, the validation handler then erases the data entries classified as "configuration," leaving the validation copy ready for new commands.

At operation 406, the validation handler of the network device enters a new configuration profile command. The validation handler enters each command received at operation 402 one by one to the shadow interpreter, such as the shadow interpreter 306 discussed with respect to FIGS. 3A and 3B. As the isolated validation environment is not connected with the actual hardware (i.e., is not permitted to change the nature of any part of the currently running network device configuration during run-time), the shadow interpreter is capable of validating the compatibility of the new configuration command. The shadow interpreter runs the same code as the main command interpreter, ensuring proper configuration with the device directly, rather than indirectly through the use of test networks or simulated devices. After each command, the validation handler determines whether there are more commands in the new configuration profile received at operation 402. If "YES", the validation handler continues to enter configuration commands.

After all the new configuration commands are entered, the validation handler generates a validation report and transmit the report to the administrator at operation 408. The validation report identifies which commands were compatible and, if not, that an error occurred. In various embodiments, the validation report may indicate an explanation of the type of error that arose. In some embodiments, the validation report identifies specifically which line of the command code was incompatible. The network device sends the validation report to the administrator for analysis.

After generating the validation report, the validation handler destroys the isolated validation environment at operation 410. In various embodiments, destroying the isolated validation environment comprises ceasing execution of the shadow interpreter. In some embodiments, the validation handler may store the validation copy (the configuration database created after all commands are entered at 406). By storing the validation copy, the validation handler may be capable of entering the configuration commands into the main command interpreter to effectuate the new configuration profile, if no errors were found. In other embodiments, destroying the isolated validation environment includes flushing the validation copy.

After receiving the validation report, an administrator analyzes the validation report. If no errors were found, then the administrator may optionally save the validation report data at operation 412. If errors are discovered, however, the new configuration profile is revised at operation 414. In various embodiments, the revision may be conducted by a user at the administrator site or locally at the network device. The user may identify the specific failed commands in the validation report and determine how to revise the commands to attain compatibility. In other embodiments, machine learning or other predictive solutions may be applied to the data. Once revised, the revised configuration profile may be sent to the network device at operation 416, and the cycle (operations 402-410) may be run again on the newly revised configuration profile.

Figure 5:
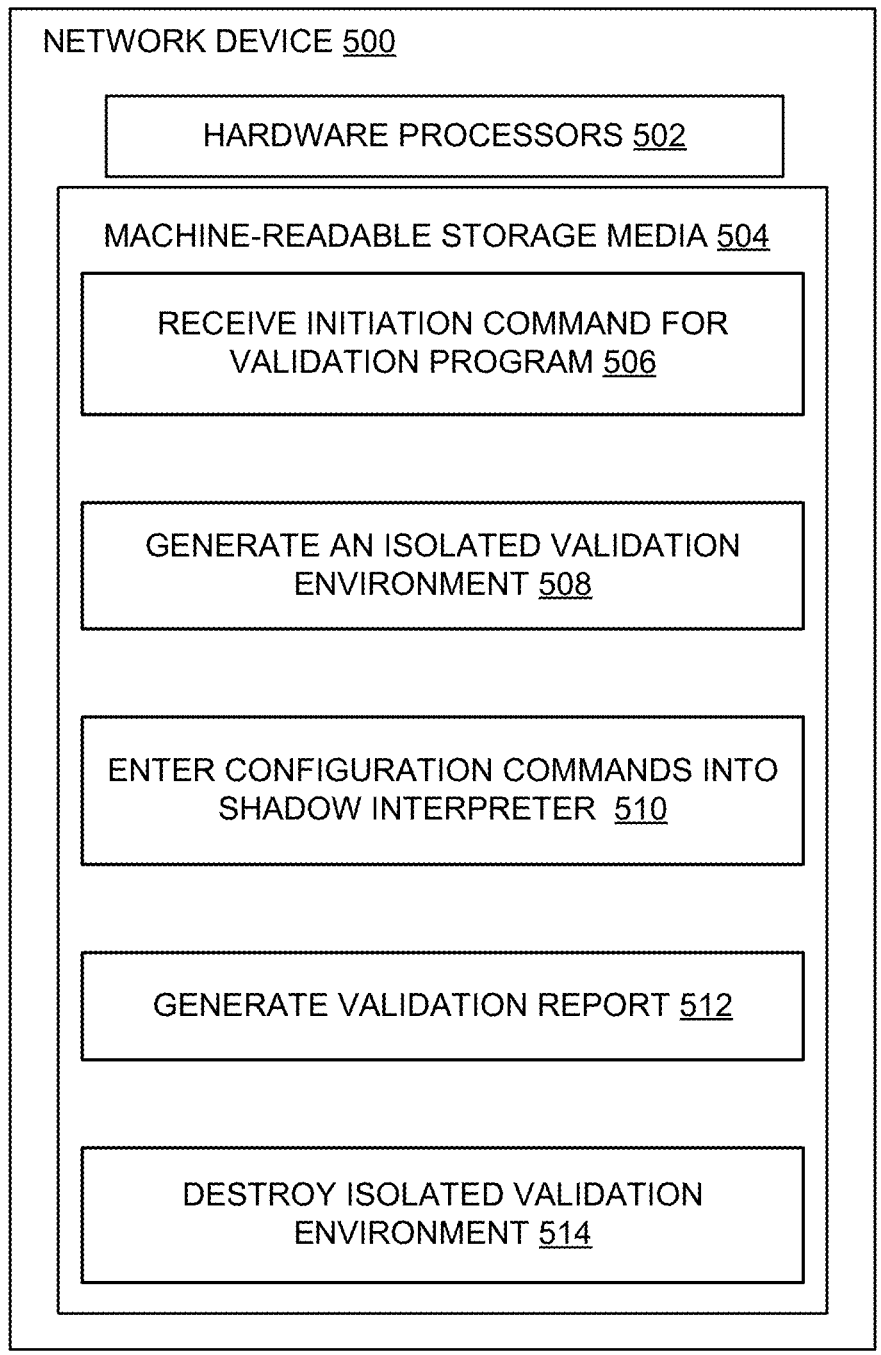
FIG. 5 illustrates an example network device with machine-readable instructions in accordance with various embodiments of the technology disclosed herein.

FIG. 5 illustrates an example network device 500 in accordance with various embodiments of the technology disclosed herein. In various embodiments, the network device 500 may be similar to the network devices 106, 108, 110, 112 and network device 200 discussed with respect to FIGS. 1-4. Network device 500 includes hardware processors 502. In various embodiments, hardware processors 502 may be similar to the processor 202 discussed above with respect to FIGS. 1-4. In various embodiments, hardware processors 502 may include one or more processors.

Hardware processors 502 are configured to execute instructions stored on a machine-readable medium 504. Machine readable medium 504 may be one or more types of non-transitory computer storage mediums. Non-limiting examples include: flash memory, solid state storage devices (SSDs); a storage area network (SAN); removable memory (e.g., memory stick, CD, SD cards, etc.); or internal computer RAM or ROM; among other types of computer storage mediums. The instructions stored on the machine-readable medium 504 may include various sub-instructions for performing the function embodied by the identified functions. For example, the instruction "Receive Initiation Command for Validation Program" 506 may include various sub-instructions for receiving and routing the initiation command between networking interfaces of the network device 500 (not shown) and the validation handler, such as the functions discussed with respect to the networking interfaces 212 discussed with respect to FIGS. 1-4. Also, this instruction may include sub-instructions for identifying a new configuration profile included within the initiation command, containing new configuration commands to be validated, as discussed with respect to FIGS. 1-4. The instruction "Generate An Isolated Validation Environment" 508 may include various sub-instructions for a validation handler of a network device 500 to create a sandbox-type environment in which commands may be run without the permissions necessary to change the operation of the network device 500, such as the isolated validation environment 304 discussed with respect to FIGS. 1-4. This instruction may also include sub-instructions for generating a shadow interpreter comprising a second instance of the process of the command interpreter. The instruction "Enter Configuration Commands Into Shadow Interpreter" 510 may include sub-instructions to cause a validation handler to enter each new configuration command received in an initiation command, as discussed with respect to FIGS. 1-4. This instruction also may include sub-instructions to copy all of the data tables included within the configuration database and erase the "configuration" data entries, as discussed with respect to FIGS. 1-4. The instruction "Generate Validation Report" 512 may include sub-instructions to identify specific commands that failed and an explanation of the error, as discussed above with respect to FIGS. 1-4. The instruction "Destroy Isolated Validation Environment" 514 may include sub-instructions to cease operation of a shadow interpreter process and flush the configuration data associated with the isolated validation environment, as discussed with respect to FIGS. 1-4.

Using the embodiments of the technology disclosed herein, an administrator can reconfigure multiple network devices at the same time, while each device is operating in the network. By distributing the validation load to the network devices themselves, validation of multiple network devices is possible without the need for multiple test environments or the creation of multiple simulated version of the devices. In various embodiments, all of the network devices may be simultaneously validating new configuration profiles. The embodiments of the technology disclosed herein drastically reduces the time it takes to implement new configurations within a network.

In various embodiments, the method 400 discussed with respect to FIG. 4 may be implemented for a plurality of network devices at the same time. In some embodiments, the new configuration profile sent at operation 408 may be sent to a plurality of network devices that are similar. For example, if the administrator wants to reconfigure routers within the network, the administrator may send the same new configuration profile at operation 408 to some or all of the routers within the network. Each router may perform its own validation, sending back validation reports. Based on the validation reports, the administrator may then tailor the configuration profile for each router. In other words, the administrator can reconfigure a plurality of routers in parallel, rather than one at a time using a test network or a simulated version. Moreover, as the validation is being performed on the actual hardware, there is no issue regarding integrating the new configuration profile into the device; the configuration profile was already validated on the specific hardware, so it does not need to be adjusted to account for differences between a test device or a simulator and the target device.

Figure 6:
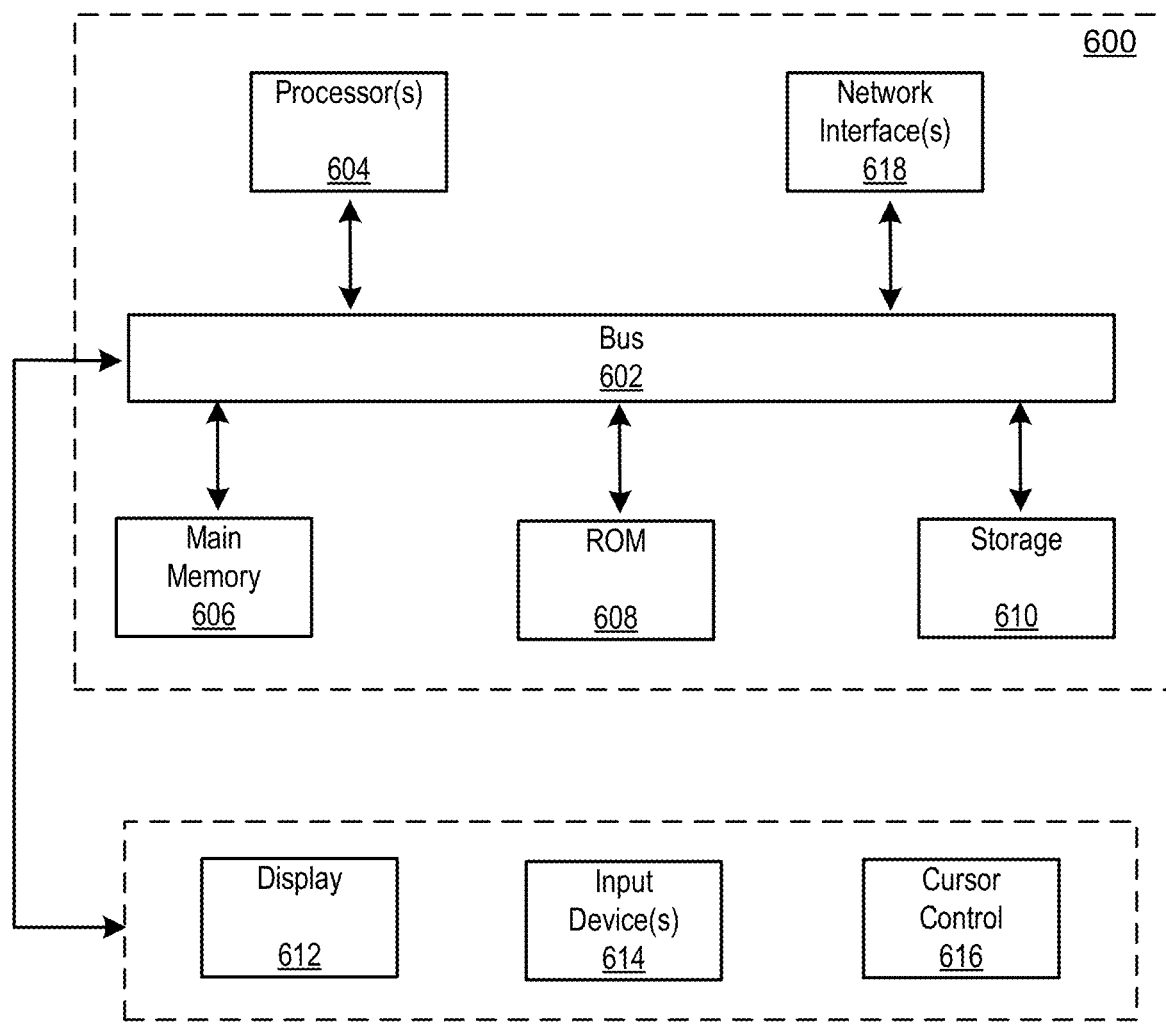
FIG. 6 is an example computing component that may be used to implement various features of embodiments described in the present disclosure.

FIG. 6 depicts a block diagram of an example computer system 600 in which various embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

In common usage, the term "or" can have an inclusive sense or exclusive sense. As used herein, the term "or" should always be construed in the inclusive sense unless the exclusive sense is specifically indicated or logically necessary. The exclusive sense of "or" is specifically indicated when, for example, the term "or" is paired with the term "either," as in "either A or B." As another example, the exclusive sense may also be specifically indicated by appending "exclusive" or "but not both" after the list of items, as in "A or B, exclusive" and "A or B but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:
   in response to receiving, at a network device, a validation start command,
   generating, by a validation handler of the network device, an isolated validation environment within the network device, wherein the validation environment is a sandbox-type execution environment, wherein executing configuration command in the sandbox-type execution environment does not affect operations in the network device, generating the isolated validation environment comprising:
      generating a validation copy of a database of the network device storing a plurality of data tables;
      initiating a shadow interpreter process comprising a new instance of a main command interpreter process executing on the network device, wherein the initiated shadow interpreter process is executed concurrently with the main command interpreter process;
      entering, by the validation handler, one or more configuration commands received in the validation start command; and
   generating, by the validation handler, a validation report reflecting results of entering the one or more configuration commands.

2. The method of claim 1, wherein the plurality of data tables of the validation copy contain a plurality of data associated with one or more functional components of the network device.

3. The method of claim 2, wherein the one or more functional components comprises hardware components and/or functions of the network device.

4. The method of claim 1, generating the validation copy comprising:
   copying, by the network device, the configuration database; and
   deleting one or more data entries in the plurality of data tables of the validation copy classified as a configuration data entry.

5. The method of claim 1, wherein the validation start command is received over a network connection.

6. The method of claim 1, wherein the validation start command is received through a user interface of the network device.

7. The method of claim 1, wherein the validation report is sent to an administrator, the method further comprising:
   identifying one or more errors in the validation report;
   generating a revised configuration profile, comprising revised configuration commands; and
   sending the revised configuration commands to the network device in a new validation start command.

8. The method of claim 1, further comprising destroying, by the validation handler, the isolated validation environment.

9. The method of claim 8, wherein destroying the isolated validation environment comprises ceasing operation of the shadow interpreter.

10. The method of claim 1, further comprising storing, by the validation handler, the validation copy after the validation handler enters all of the configuration commands.

11. The method of claim 1, wherein an administrator sends a validation start command comprising configuration commands to a plurality of network devices within a network, the plurality of network devices configured to execute the method of claim 1.

12. A network device, comprising:
   a processor;
   a network interfacing component comprising one or more interfaces;
   a memory;
   a configuration database; the configuration database configured to maintain a plurality of data tables comprising a plurality of configuration commands;
   the processor configured to execute a validation program by:
      in response to receiving, at a network device, a validation start command,
      generating, by a validation handler of the network device, an isolated validation environment within the network device, wherein the validation environment is a sandbox-type execution environment, and wherein executing a configuration command in the sandbox-type execution environment does not affect operations in the network device, generating the isolated validation environment comprising:
         generating a validation copy of a database of the network device storing a plurality of data tables;
         initiating a shadow interpreter process comprising a new instance of a main command interpreter process executing on the network device, wherein the initiated shadow interpreter process is executed concurrently with the main command interpreter process;
         entering, by the validation handler, one or more configuration commands received in the validation start command; and
      generating, by the validation handler, a validation report reflecting results of entering the one or more configuration commands.

13. The network device of claim 12, wherein the network device comprises one of: a router; a network switch; a bridge; a modem.

14. The network device of claim 12, wherein the configuration database and the memory are a single component, the configuration database comprising a partitioned portion of the memory.

15. The network device of claim 12, wherein the network device further comprises a user interface.

16. The network device of claim 12, the processor further configured to execute one or more network functions, the one or more network functions executed at a same time as the validation program.

17. The network device of claim 16, wherein the network device comprises a plurality of processors, and one or more processors are dedicated to performing the validation program.

18. A method of online validation of configuration commands of a network device, comprising:

maintaining, on the network device, a configuration database comprising a plurality of data tables containing information associated with hardware components and functions of the network device;

in response to receiving, from an administrator, a validation start command, generating, by a validation handler of the network device, an isolated validation environment within the network device, wherein the validation environment is a sandbox-type execution environment, and wherein executing a configuration command in the sandbox-type execution environment does not affect operations in the network device, generating the isolated validation environment comprising:

generating a validation copy of a database of the network device storing a plurality of data tables;

initiating a shadow interpreter process comprising a new instance of a main command interpreter process executing on the network device, wherein the initiated shadow interpreter process is executed concurrently with the main command interpreter process;

entering, by the validation handler, one or more configuration commands received in the validation start command; and generating, by the validation handler, a validation report reflecting results of entering the one or more configuration commands; and sending the validation report to the administrator.

19. The method of claim 18, further comprising:

receiving, from the network device, the validation report;

identifying one or more errors in the validation report;

determining one or more of the configuration commands that caused the errors;

revise one or more of the configuration commands to generate revised configuration commands responsive to the one or more errors identified in the validation report; and send the revised configuration commands to the network device in a new validation start command.

20. The method of claim 19, wherein the network device is configured to execute one or more network function at a same time as the validation program.

* * * * *